United States Patent [19]
Duneau

[11] 4,413,697
[45] Nov. 8, 1983

[54] AIR CUSHION VEHICLE

[76] Inventor: Claude Duneau, 64 Levée des Tuileries, 41000 Blois, France

[21] Appl. No.: 317,892

[22] PCT Filed: Mar. 3, 1981

[86] PCT No.: PCT/FR81/00025
  § 371 Date: Oct. 30, 1981
  § 102(e) Date: Oct. 30, 1981

[87] PCT Pub. No.: WO81/02552
  PCT Pub. Date: Sep. 17, 1981

[30] Foreign Application Priority Data
  Mar. 3, 1980 [FR] France .............................. 80 040702

[51] Int. Cl.³ .......................... B60V 1/04; B60V 1/15
[52] U.S. Cl. .................................... 180/120; 180/127
[58] Field of Search .............. 180/120, 122, 121, 126, 180/127, 117; 114/67 A

[56] References Cited
U.S. PATENT DOCUMENTS
  3,398,809  8/1968  Wood et al. ................... 180/120 X
  3,473,503  10/1969  Gunther ........................... 180/126 X
  3,877,542  4/1975  Paoli ..................................... 180/120
  4,111,277  9/1978  Peissel ................................ 180/127

FOREIGN PATENT DOCUMENTS
  2134171  12/1972  France ............................... 180/126
  1245811  9/1971  United Kingdom ................ 180/127
  1481011  7/1977  United Kingdom ................ 180/126

*Primary Examiner*—John A. Pekar

[57] ABSTRACT

Disclosed is an air cushion vehicle intended to move on land or water, having a platform surrounded by an inflatable skirt. A belt is positioned around the platform interior of the skirt and includes a first face directed toward the central axis of the platform and downward and a second face forming a support pad. At least one nozzle is provided under the platform into the first face to form an air cushion.

8 Claims, 6 Drawing Figures

AIR CUSHION VEHICLE

The present invention relates to a vehicle intended to move on an air cushion, adapted to be propelled on land or water, comprising a central platform, lifting means for establishing an air cushion under said platform and for lifting it relative to the ground or the water surface, as well as propulsion means for assuring the gliding of said platform on the air cushion thus created.

In particular, the invention is directed to a vehicle using an air cushion which comprises on its periphery an inflatable skirt which ensures tightness with respect to the support (ground or water) on which the vehicle moves.

Vehicles of this type are already known but present, in general, the drawback of being conceived for only one particular utilization and not adapted for being converted to another usage.

It is the object of the present invention to provide a vehicle which moves on an air cushion, is of particularly simple construction and can without difficulty be transformed so as to be adapted to any desired mode of utilization. The same vehicle can thus be used for professional purposes and, by means of a simple change of the body, can be made ready for recreational purposes. As will be set forth below, this possibility of transformation is not only due to the inherent structure of the vehicle, but also to the particular arrangement of lifting and propulsion means in the structure.

The vehicle according to the invention which is intended for moving over ground or water, contains a central platform which is surrounded by an inflatable skirt, as well as lifting means for creating an air cushion under said platform, and propulsion means; it is characterized in that it comprises between said platform and said skirt a belt surrounding said platform and providing under the platform a first face directed obliquely toward the vertical central axis of the platform and downwards, extending outwardly of the platform by a second horizontal face, with said second face forming a support pad, and at least one nozzle connected to the lifting means, opening under the platform into said first oblique face of the belt for the formation of the air cushion, with said belt receiving on its outer periphery a shaped piece for fixing the skirt.

According to one feature of the invention, the first oblique face of the belt forms an angle between 50° and 70° with the horizontal, i.e., the plane of the central platform.

In a preferred embodiment the belt is constituted by a tube with a polygonal cross section, with two adjacent faces of the tube forming the first oblique face and the second horizontal support face.

Said belt which ensures the stiffening of the structure allows for an easy transformation of the vehicle in accordance with the desired use thereof.

Other objects and advantages will become clear upon reading the following description with attached drawings, giving non-limitative examples.

Figure 1:
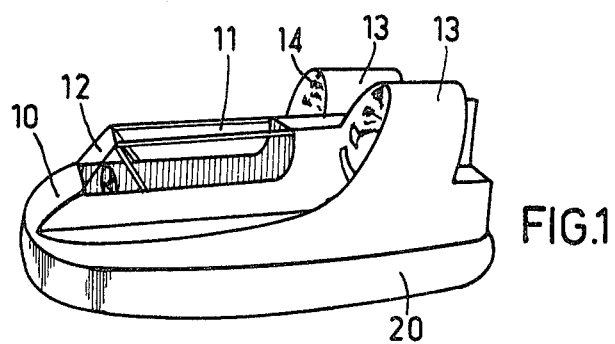
FIG. 1 is a perspective, lateral view of the unit, showing one embodiment of the vehicle according to the invention.
Figure 2:
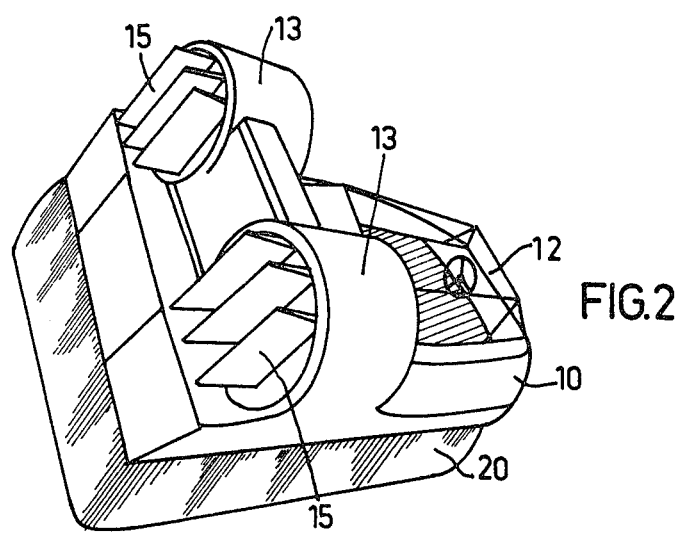
FIG. 2 shows the vehicle of FIG. 1, seen in a three-quarter rear view.
Figure 3:
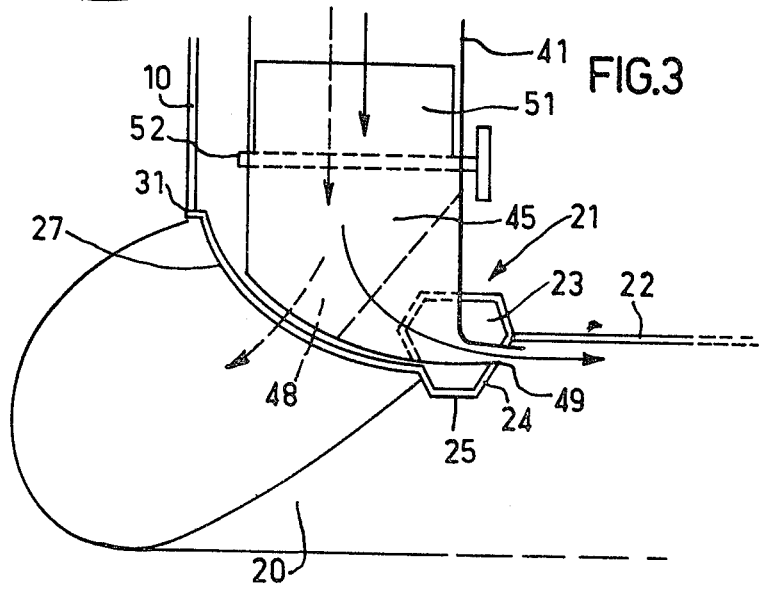
FIG. 3 is a transverse, sectional view of a portion of the structure of a vehicle according to the invention.
Figure 4:
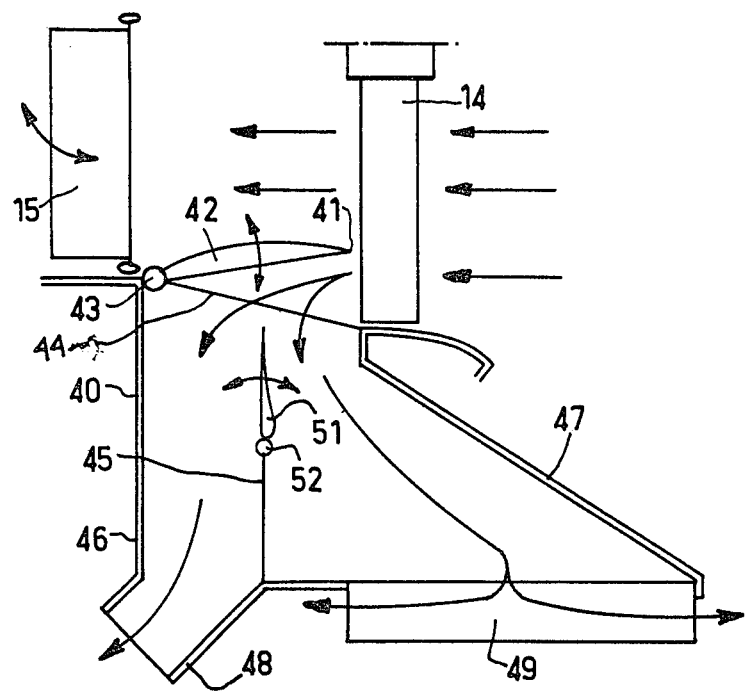
FIG. 4 is a schematic view of the lifting and propulsion means of this vehicle.

Referring now to FIGS. 1 and 2, the vehicle according to the invention has in its preferred embodiment a body 10, forming a cabin 11 which is protected in front by a windshield 12, and is equipped in the rear with two annular housings 13, each surrounding a multiblade propeller, driven by a motor (not visible).

Behind said housings, in the path of the air stirred up by the propellers, rudders 15 are provided (here in two groups of three), which are, for example, actuated by the steering wheel through a suitable linkage.

At its periphery the body 10 carries an inflatable tightness skirt 20 which will be described below.

The body 10 is fixed on a structure comprising essentially an annular belt 21 which surrounds a central platform 22, with said belt being formed by a tubular shape piece 23, which has, for example, a polygonal cross section.

Said belt 21 provides a face 24 under the platform 22, said face being directed obliquely downwards and toward the vertical central axis of the platform, making an angle $\alpha$ with the horizontal, while said belt provides on its entire length a second, horizontal face 25, intended to be used as support pads on the ground or on water when the lifting means are not in operation.

Figure 6:
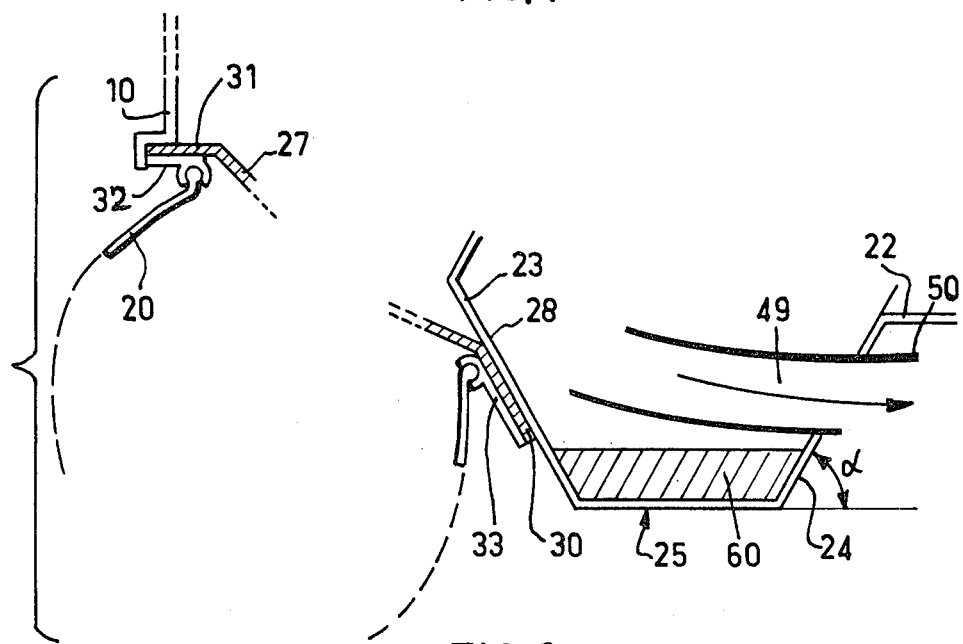
FIG. 6 shows in particular a way of fixing the tightness skirt of the vehicle.
Figure 5:
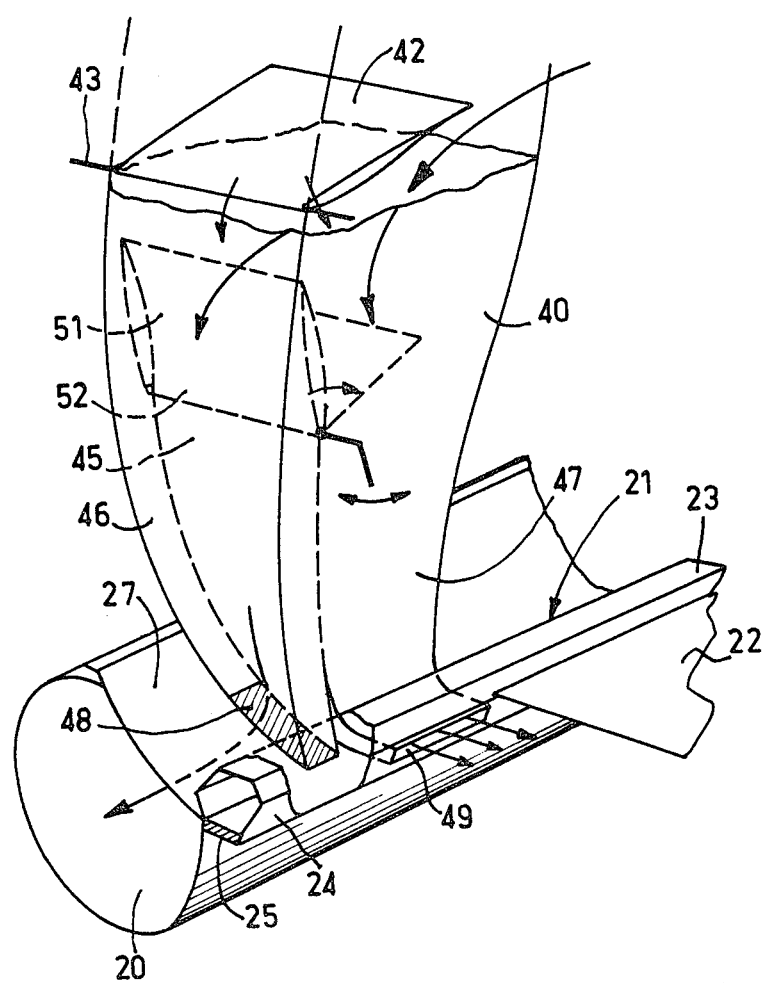
FIG. 5 is a perspective view of the means of FIG. 4 associated with the vehicle structure.

This faces 24 and 25 are preferably faces of the polygonal shaped piece 23. The belt 21 provides a support for the skirt by means of a second shaped piece 27 having a curved cross section, which is directed outwardly and upwards, constituting a kind of gutter all around the belt. Said shaped piece 27 is, for example, attached to an oblique outside face 28 of the tubular shaped piece 23, by an edge 30 (FIG. 6) and ends in a horizontal edge 31, intended for the fixation by appropriate means of the body 10 which can easily be removed and is thus interchangeable.

It is, of course, possible to replace the unit constituted by the platform 10, the tubular shaped piece 23 and the shaped piece 27 by a single plate which is correctly shaped by stamping and provides the faces 24, 25 and 28 as well as the shaped piece 27 and the platform 28.

For the attachment of the skirt 20, special shaped pieces 32 and 33 are fixed to the edges 30 and 31 and receive the free edges of the skirt.

The lifting and propulsion means include, in association with the propeller 14, a duct 40, the inlet 41 of which opens toward the top, directly behind said propeller, between the latter and the rudders 15. A first flap 42 which can rotate around a horizontal shaft 43, is arranged above said inlet 41. This flap 42 is associated with manual controls (not shown) and can be moved between a position in which it completely closes the inlet 41 and a position in which it clears the inlet to channel therethrough a large portion of the air driven by the propeller. By changing the position of said flap 42, one can admit into the duct 40 more or less air, or no air at all. The frontal edge 44 of the flap 42 is very close to the plane of the propeller blades in such a way as to reduce the turbulence between the flap and the blades. The duct 40 is divided vertically by a partition 45 into two sections 46 and 47 which end, respectively, by a nozzle 48 going through the shaped piece 27 to end in the skirt 20, and by a nozzle 49 which ends in the inclined face 24 of the belt 21, directly below the platform 22. This nozzle 49, correctly shaped, ends along a substantially horizontal line, its outlet having an alongated cross section, with its long axis parallel to the platform 22. The nozzle 49 is equipped at its upper part with a baffle 50 which is intended for assuring a better channeling of the escaping air.

The upper edge of the partition 45 is extended by a second flap 51, rotating around a shaft 52 adjacent that edge and installed below flap 42, with said shaft being actuated by manual controls in such a manner as to ensure the desired distribution of the air flow (admitted by the desired setting of the first strangler 42) between the two nozzles 48 and 49.

In this manner, the air flow created by the propeller 14 ensures the propulsion and acts upon the rudders 15, but, thanks to the flaps 42 and 51, ensures also the lifting of the vehicle by forming an air cushion under the platform, as well as the inflation of the skirt.

It is possible to install the lifting and propulsion means at any appropriate location of the vehicle, depending upon the use of the latter. The vehicle structure is particularly suited to the flexibility in the choice of this location.

For greater efficiency, the angle α formed by the oblique face 24 and the horizontal lies between 50° and 70°, said angle being chosen especially according to the location of the nozzle 49 with respect to the body of the vehicle and its travelling direction. Thus, when the nozzle 49 is placed in the front part of the vehicle, the angle α is chosen close to 50°; however, if the nozzle is in the rear, the angle α is chosen close to 70°.

According to a preferred arrangement, for the purpose of reinforcing the structure, the bottom of the belt 21 is coated with a resin layer 60 which gives support pads 25 a greater stiffness without adding any significant weight.

It is to be noted that the described embodiment includes propellers 14 which ensures lifting and propulsion. A platform of the same structure, i.e., one with a peripheral stiffening belt, can be equipped with the lifting means alone; in this case, the propeller has, for example, a vertical rotation axis, and the platform used as lifting means can be moved by towing devices or can be equipped with driving or non-driving wheels which can possibly be equipped with low-pressure pneumatic tires driven, for example, by hydraulic motors.

Of course, the present invention is not limited to the embodiments described and shown but is susceptible of numerous modifications available to those skilled in the art in accordance with the envisaged applications and without deviating from the spirit of the invention.

I claim:

1. Air cushion vehicle intended to move on ground or on water, equipped with a central platform surrounded by a belt to which an inflatable skirt is fixed as well as with lifting means for establishing an air cushion under said platform, and propulsion means; wherein said belt surrounding the platform provides under said platform a first face directed obliquely toward the vertical central axis of the platform and downward, and a second horizontal face extending toward the outside of the platform to form a support pad; with at least one nozzle connected to the lifting means, opening under the platform into said first oblique face of the belt for the creation of the air cushion, said belt being equipped on its outer periphery with a shaped piece for fixing the skirt.

2. Vehicle according to claim 1, wherein said first oblique face of the belt forms an angle between 50° and 70° with the plane of the central platform.

3. Vehicle according to claim 1, wherein said belt includes a polygonal cross-section tube, with two adjacent faces of said tube being used as the first oblique face and the second horizontal support face.

4. Vehicle according to claim 1, wherein said shaped piece for fixing the skirt extends from the belt toward the outside of the platform in an upward direction and ends in an edge intended for fixing the vehicle body, with said skirt being formed by a continuous strip, the two edges of which are respectively attached to the outer edges of said shaped piece.

5. Vehicle according to claim 1, wherein the lifting means include a propeller, a duct having an inlet positioned under and directly behind the propeller and equipped with a first distribution flap pivotally mounted around a horizontal shaft from a closed position of said inlet to various positions of admission and channeling of the air flow created by the propeller toward the duct, with said duct being divided in two sections by a vertical partition positioned directly behind a second pivotally mounted flap for dividing the admitted air as needed in the duct toward each of said two sections, the first one of said two sections ending by a nozzle opening into the skirt through the shaped piece and the second one of said two sections, after having matched the outline of said shaped piece, ending through a nozzle which opens under the platform, through the first oblique face of the belt.

6. Vehicle according to claim 5, wherein the nozzle opening under the platform ends along a substantially horizontal direction.

7. Vehicle according to claim 5, wherein each of the rotating flaps is associated with manual controls.

8. Vehicle according to claim 5, wherein the propeller also provides propulsion, with rudders installed behind the propeller.

* * * * *